United States Patent [19]

Parker

[11] Patent Number: 5,197,007
[45] Date of Patent: Mar. 23, 1993

[54] CONTROL SYSTEM FOR VEHICLE MEMORY SEAT RECALL POSITIONING

[75] Inventor: David A. Parker, Westland, Mich.

[73] Assignee: United Technologies Automotive, Inc., Dearborn, Mich.

[21] Appl. No.: 693,217

[22] Filed: Apr. 30, 1991

[51] Int. Cl.[5] .................. B60N 2/02; G06F 15/20
[52] U.S. Cl. .................. 364/424.05; 318/466; 318/568.1; 296/65.1
[58] Field of Search .............. 364/424.05; 307/9.1, 307/10.1; 296/65.1; 318/466, 467, 468, 568.1

[56] References Cited

U.S. PATENT DOCUMENTS

| | | | |
|---|---|---|---|
| 4,204,255 | 5/1980 | Cremer | 364/424.05 |
| 4,404,632 | 9/1983 | Harada et al. | 364/424.05 |
| 4,434,468 | 2/1984 | Caddick et al. | 364/424 |
| 4,510,426 | 4/1985 | Michaels et al. | 318/565 |
| 4,706,194 | 11/1987 | Webb et al. | 364/424 |
| 4,812,838 | 3/1989 | Tashiro et al. | 364/424.05 |
| 4,845,620 | 7/1989 | Parker | 364/424.05 |
| 4,853,687 | 8/1989 | Isomura et al. | 364/424.05 |
| 4,907,153 | 3/1990 | Brodsky | 318/467 |

Primary Examiner—Gary Chin
Attorney, Agent, or Firm—Michael Grillo

[57] ABSTRACT

A memory seat control system provides repositioning of one memory seat to a recall position corresponding to another memory seat when the absolute location of both seats along corresponding travel axes is known. Additionally, the control system allows a recall position for one seat, e.g., a passenger's seat, to be entered from another seat, e.g., a driver's seat, when the absolute location of both seats along corresponding travel axes is known.

18 Claims, 7 Drawing Sheets

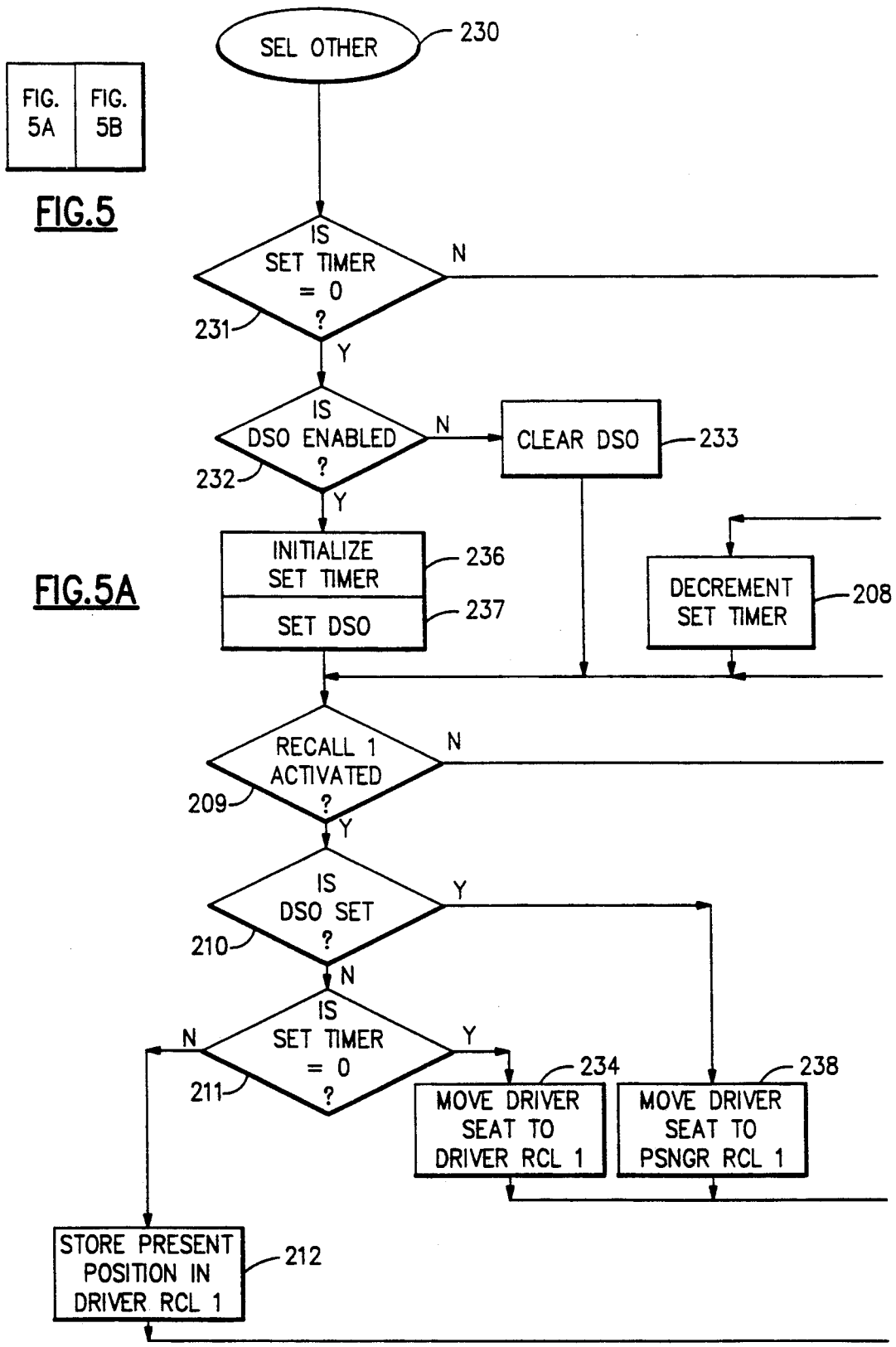

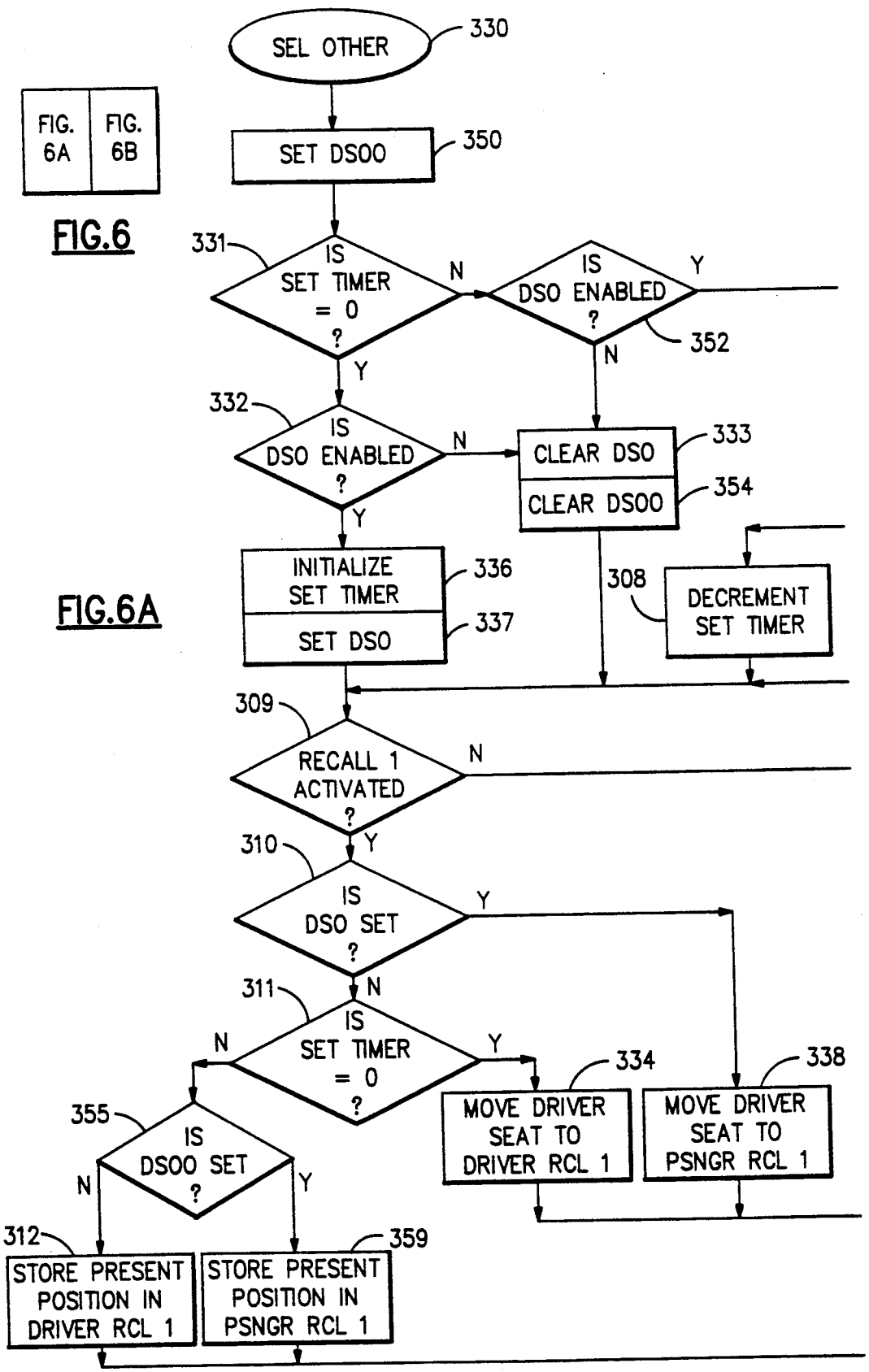

CONTROL SYSTEM FOR VEHICLE MEMORY SEAT RECALL POSITIONING

DESCRIPTION

1. Technical Field

This invention relates to a control system for memory seats and more particularly to a control system which provides repositioning of one memory seat to recall positions for another memory seat.

2. Background Art

It is well known to provide driver and passenger seats within present day vehicles with a "memory" capability for automatically directing a seat to a selected one of one or more preselected "memory" or "recall" positions. Memory seats are typically driven by a plurality of electric motors in a reversible direction, along or about a plurality of respective paths or axes. In most such systems, at least the driver's seat and typically also the front passenger's seat are provided with respective memory capability. Moreover, each seat possessing such memory capability is capable of storing at least one preselected recall position, and typically two recall positions and sometimes more. Examples of such memory seat controllers may be found in U.S. Pat. Nos. 4,434,468 to Caddick et al.; 4,510,426 to Michaels et al.; 4,706,194 to Webb et al.; and 4,845,620 to Parker, the later two patents being assigned to the owner of the present application.

In a typical memory seat control system such as the memory seat controllers described in the aforementioned patents, the position sensing and memory position control function relies upon the input of digital signals, representative of incremental displacement of the seat, to a digital processor or controller. Such systems utilize a sensor, as for instance, a Hall-effect sensor, which is positioned with respect to some moving portion of the seat assembly such that increments of seat displacement result in the production of respective digital signals. These digital signals are then counted to provide an indication of the magnitude of seat displacement. Correspondingly, specific recall positions are identified or determined by a particular digital signal count stored in a memory. It is to this digital-type of memory seat controller that the present invention applies.

The aforementioned memory seat control systems possess certain limitations. For instance, it is typically desirable to provide at least two separate memory locations for each seat in a vehicle having memory positioning capability. In this manner, the seat position for at least two of the primary users of the vehicle may be programmed for each of the memory seats. Such systems require at least four memory locations to thereby provide two recall positions for a driver's seat and two recall positions for a passenger's seat. Users of the vehicle other than the users having programmed memory seat recall positions are required to manually position the seat to a desired position. For example, if a driver pulls into a rest area and a passenger takes over driving, the driver's seat and passenger's seat must be manually repositioned unless the corresponding desired seat position is stored in one of the memory locations for the respective seat. This may be of particular inconvenience in upper line vehicles having many axes of movement associated with seat positioning.

DISCLOSURE OF INVENTION

Objects of the present invention include provision of an improved control system for controlling the operation of vehicle memory seats which provides enhanced memory capability and which is economical with respect to memory capacity.

According to the present invention, a memory seat control system comprises a plurality of reversible motors operative to reversibly drive a pair of memory seats along a plurality of corresponding axes of limited extent; digital signals are produced during operation of a respective motor, each digital signal being representative of incremental displacement of a seat along a corresponding axis; the digital signals are counted and stored as present position signals in a plurality of present position registers, the present position signal in each present position register being indicative of present seat displacement along the corresponding axis; and a plurality of recall positions are provided for each of the seats, each recall position having a plurality of recall position registers for storing digital signal counts as recall signals indicative of seat displacement along corresponding travel axes at the respective recall position, the difference between a present position signal and a corresponding recall signal being indicative of the amount of seat movement to reposition a seat from its present position to the corresponding recall position, the control system allowing one of the memory seats to be repositioned from its present position to a recall position corresponding to another of the memory seats when the absolute location of both seats along the corresponding axes is known.

In accordance with a further aspect of the present invention, a recall position for one of the memory seats can be entered from a control panel corresponding to that one seat at any time after initial start-up of the control system, and a recall position for another of the memory seats can be entered from the control panel for the one memory seat only after the absolute location of both seats along the travel axes is known.

The present invention represents an improvement over the prior art because the memory capability of the vehicle memory seat control system has been enhanced without a corresponding increase in the amount of required memory registers or locations. For example, as in the prior art, two separate memory seat recall positions may be provided for both the driver's seat and the passenger's seat. However, the present invention provides the benefit of allowing one of the memory seats to be repositioned to a recall position corresponding to another of the memory seats. This effectively increases the recall positions available for each of the seats to four separate memory locations, the two memory locations associated with the one memory seat, and the two memory locations associated with the other memory seat, thereby doubling the available recall positions for a seat without a corresponding increase in the required memory capacity.

The present invention also provides the added capability of allowing a recall position for one of the seats, e.g., the passenger's seat, to be entered from another of the seats, e.g., the driver's seat. This is of particular convenience when both recall positions for the driver's seat are already in use, and a recall position for the passenger's seat is available.

The foregoing and other objects, features and advantages of the present invention will become more apparent in light of the following detailed description of exemplary embodiments thereof, as illustrated in the accompanying drawings.

BRIEF DESCRIPTION OF DRAWINGS

FIG. 5, 5A and 5B are flow diagrams of a control routine executed by the CPU for implementing the transfer of memory seat recall positions in accordance with the invention; and FIG. 6, 6A and 6B are flow diagrams of an alternative control routine executed by the CPU for implementing the transfer of memory seat recall positions in accordance with the invention.

BEST MODE FOR CARRYING OUT THE INVENTION

Memory Seat Control System (Prior Art)

The improved memory seat control system of the present invention is intended for use with a control system of the type described in the aforementioned U.S. Pat. No. 4,845,620 to Parker entitled "CONTROL ARRANGEMENT FOR VEHICLE MEMORY SEAT", the disclosure of which is incorporated herein by reference.

Figure 1:
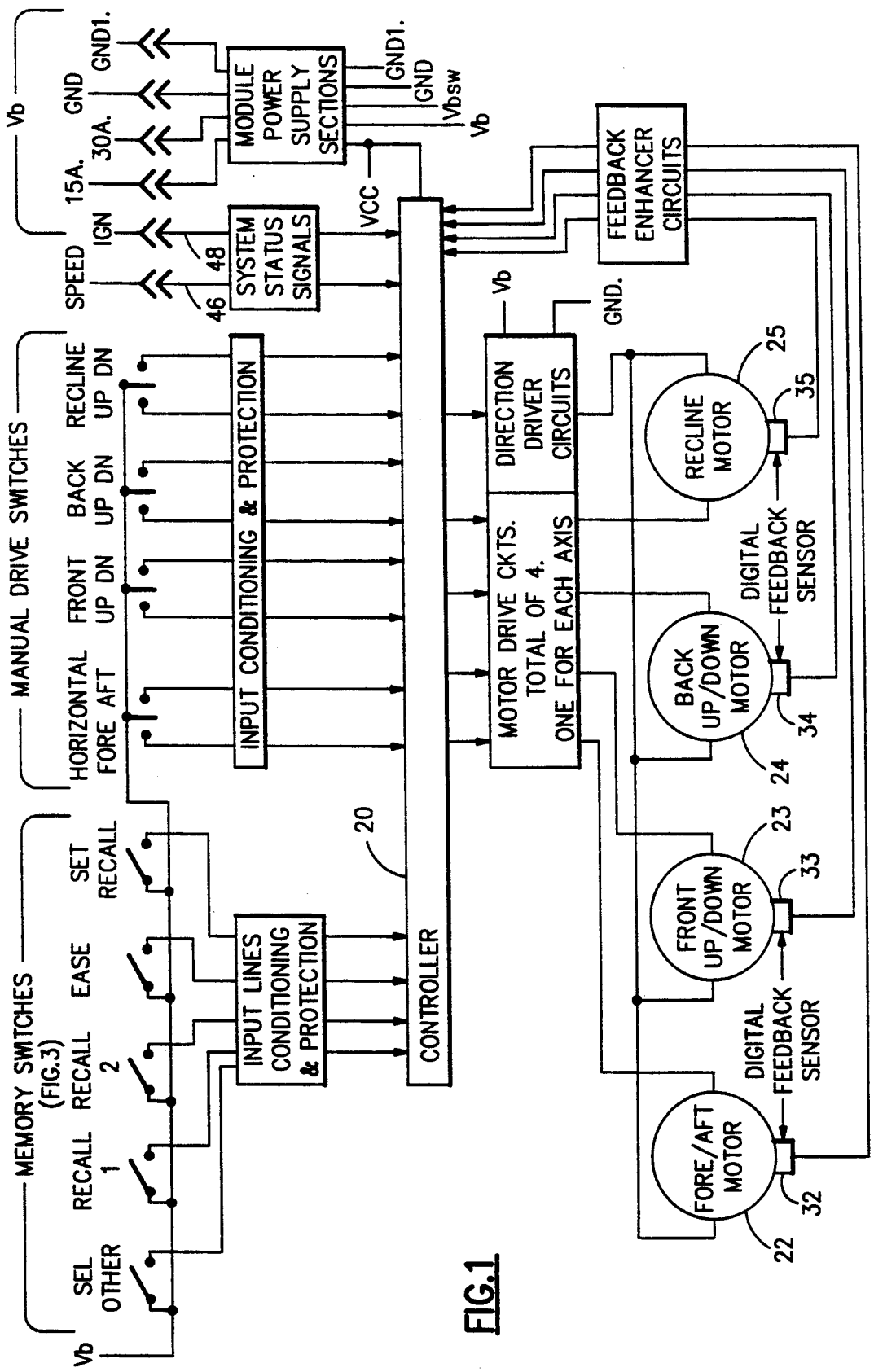
FIG. 1 is a schematic block diagram of a memory seat control system in accordance with the present invention.
Figure 2:
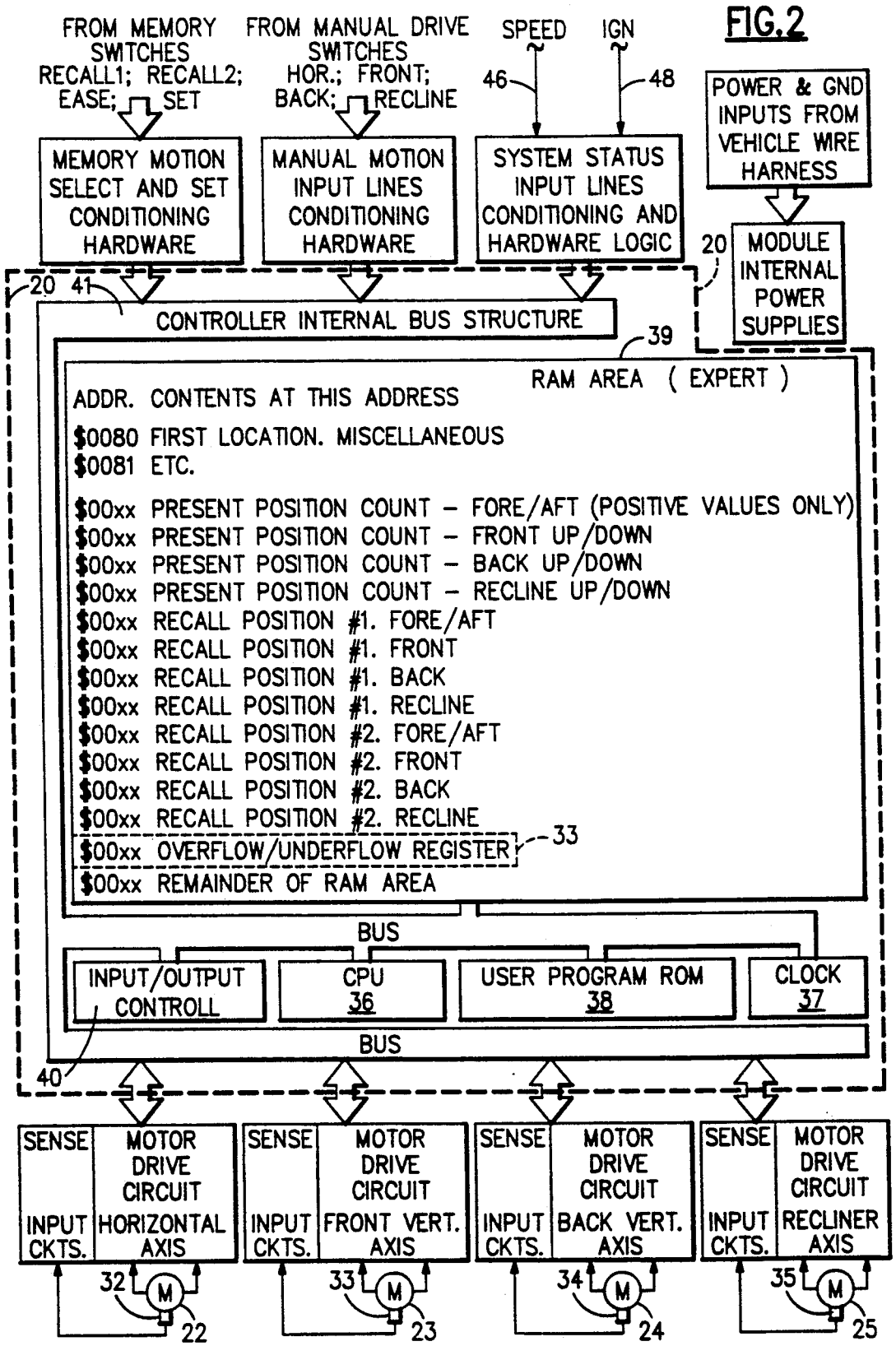
FIG. 2 is a schematic block diagram of the control system of FIG. 1 showing the architecture of a controller of the system in greater detail.

Before describing the improved memory seat control of the present invention, it will be beneficial to undertake a brief discussion of the memory seat control system depicted in FIGS. 1 and 2. Referring first to FIG. 1, a controller 20 receives input signals from a plurality of manual seat position switches (Manual Drive Switches) mounted, for example, on a panel (not shown) in a vehicle and designated HORIZONTAL, FORE-AFT; FRONT, UP-DOWN; BACK, UP-DOWN and RECLINE, UP-DOWN. Controller 20 similarly receives input signals from a plurality of memory switches, located on a memory seat control panel (FIG. 3), designated RECALL 1; RECALL 2; EASE; SELECT OTHER; and SET RECALL. The controller 20 provides motor control signals to a plurality of motors 22-25 each respectively associated with a drive mechanism (not shown). Each drive mechanism is in turn associated with a respective axis or path of seat motion. The motors include FORE-AFT MOTOR 22; FRONT, UP/DOWN MOTOR 23; BACK, UP/DOWN MOTOR 24 and RECLINE MOTOR 25. It will be noted that each of the motors is associated with a corresponding one of the manual drive switches.

Fore-aft motor 22 is connected to a drive mechanism for effecting horizontal fore and aft motion of a seat (not shown). Front, up/down motor 23 similarly is associated with a mechanism for moving the forward end of the seat up and down. Back, up/down motor 24 is associated with a mechanism for moving the back of the seat up and down. The recline motor 25 is associated with a mechanism for moving the seat-back up or down (i.e., forward and back) about a horizontal axis. It will be understood that the aforementioned manual drive switches, memory switches and drive mechanisms are generally the same for both a driver's seat and a passenger's seat in the vehicle.

Associated with each of the drive mechanisms, typically at the respective motors 22-25, is a digital feedback sensor 32-35 for sensing displacement of the motor and/or drive mechanism and providing a digital signal indicative thereof. One suitable and conventional such sensor is a Hall-effect device which is responsive to relative motion between it and another member, e.g., a magnet, for generating a digital signal associated with the passing of that member. Conventionally, such signal generating members may be placed in a known manner on the seat drive mechanism, as for instance on the shaft of a respective drive motor. Operation of a particular drive mechanism results in the generation of digital signals by the associated sensors 32-35, the quality of such signals being indicative of the magnitude of the attendant displacement of a seat along the respective axis of motion. The sensors are arranged such that for each axis of seat motion, approximate N "counts" or digital signals will be produced during motion of the associated seat through the extent of its travel path in one direction along the respective axis of motion.

Referring also to FIG. 2, the controller 20 includes a central processing unit (CPU) 36, a clock 37, a read only memory (ROM) 38, a random access memory (RAM) 39 and conventional input/output control circuitry 40 interconnected by a data bus 41. Vehicle speed and the state of the vehicle's ignition, i.e., "on" or "off", are extended to the controller 20 respectively via leads 46 and 48, to limit response of the memory seat control system to certain predetermined vehicle operating bounds stored within the controller 20.

In FIG. 2, the controller 20 is shown exclusive of the aforementioned input control switches, and generally shown are the motors 22-25 and the sensors 32-35 associated therewith. More specifically, the functional blocks of the controller 20 are generally depicted with a portion of the RAM area 39 having been exploded to depict the specific inclusion of various memory locations relevant to a further discussion of the invention. Each memory address or register is representative of a depicted area of RAM having a respective capacity for receiving and storing approximately N or preferably 1.25 N digital signals (counts), but clearly less than 2 N counts. This memory capacity configuration is the subject of the aforementioned U.S. Pat. No. 4,845,620, and is described in greater detail therein.

Depicted in the excerpts 39 of the RAM are four present position registers and eight recall position registers for one of the seats. Each present position register receives digital signals from corresponding sensors, and contains a present position signal indicative of a digital signal count corresponding to the present position of the seat along the respective axis of motion. Four of the recall position registers are associated with RECALL 1 and the remaining four recall position registers are associated with RECALL 2. Each recall position register contains a recall signal indicative of a digital signal count corresponding to a recall position of the corresponding seat along the respective axes of motion. Also depicted in exert 39, within the broken lines designated 33, is at least one memory or register location for overflow/underflow data.

It will be understood from a review of FIGS. 1 and 2 that the invention is applicable to memory seat control systems in which motion of a seat is provided not only along one but more than one axis. In the exemplary embodiment herein, bi-directional displacement of a seat is possible along four paths or axes, to wit fore and aft in a horizontal direction, up and down at the front of the seat, up and down at the back of the seat, and up and down (forward and back) motion of the recliner about its horizontal axis. Thus, if it is intended for one seat to offer two recall positions, 12 registers each having the requisite capacity is required. The present invention will work equally as well with more or less than four axes of seat movement; however, if there are more or less than four axes of seat movement, the amount of memory registers required for storing the present and recall positions of a seat should be adjusted accordingly.

As described in greater detail in the aforementioned U.S. Pat. No. 4,845,620, each of the present position registers is initialized at approximately its mid-position, and initially comprises present position signals indicative of the relative present position of a seat along the corresponding travel axis. Similarly, each of the recall position registers contain a recall signal indicative of a relative recall position of the seat along a corresponding travel axis. During movement of the seat, the present position signal in each of the present position registers increases or decreases in accordance with the movement of the seat along the respective axis. Thereafter, the difference between the present position signal and the corresponding recall signal for each axis is indicative of the amount of movement required to move the seat from its present position to its recall position along that axis.

If a memory capacity limit of a present position register is reached during movement of the seat, additional digital signals are stored in the overflow/underflow register 33. At the completion of movement along the corresponding axis, the corresponding recall position register is incremented or decremented by the signals stored in the overflow/underflow register 33 to maintain an accurate relationship between the present position signal and the recall signal.

Alternatively, as described in U.S. Pat. No. 4,845,620, when a memory capacity limit of a present position register is reached during movement of the seat, the corresponding recall position register is incremented or decremented on a real time basis, thereby maintaining the proper relationship between the present position signal and the recall signal for the corresponding axis on a real time basis.

Motion of a seat is available throughout the entire range of movement for each of the axes; however, motion on an axis is terminated when a limit or jam is reached, corresponding to a respective end of the axis. When the limit of travel is reached along an axis, this serves as positive establishment of a known position along that axis. The corresponding present position signal and recall signal may be modified when a respective end of axis condition exists so that both signals are indicative of actual, rather than relative, positions. Such signal modification is accomplished, for example, by decrementing both the present position signal and the recall signal by the present position signal at the time the end of axis is encountered. The present position signal is thereafter equal to zero at the end of the axis. In this way, the limit or origin of an axis may be positively determined such that the present position signal is thereafter precisely indicative of the actual position, rather than the relative position, of the seat along the respective axis.

The establishment of the known end of axis travel is particularly useful in the backward and downward direction if an "ease of entry" function is to be provided. The ease of entry function allows an operator to automatically command the seat, by brief actuation of the EASE switch (FIG. 3), to move to a "back" and "down" position represented by "soft stop" positions near the respective limits of those travel axes for ease of entering the vehicle. The soft stop positions are selected to be several counts removed from the absolute limit of travel along the respective axes of travel, and are stored in ease position registers (not shown) for the respective axes. The subsequent attainment of an ease position is detected by comparing the present position signal to the count in the corresponding ease position registers, and stopping movement along an axis when the present position signal is equal to the ease position count for that axis.

Transferring Recall Positions Between Seats (Embodiments of the Invention)

When the absolute position of both seats is known for all of the axes of seat motion, i.e., a limit or jam has been reached and/or the ease positions have been set for each of the axes, then if both of the seats are in an identical position, the corresponding present position signals for the respective axes are identical for each of the seats. The present invention relies on this relationship for allowing one memory seat to be repositioned to a recall position corresponding to another memory seat when the absolute position of both memory seats is known.

Upon initial start-up of the vehicle electrical system, i.e., when the electrical system is energized after being completely deenergized for example by being disconnected from the battery, transfer of memory seat recall positions between memory seats is disabled. Thereafter, the transfer function, i.e., the repositioning of one memory seat to a recall position corresponding to another memory seat, remains disabled until the absolute positions of both memory seats along the axes of movement has been determined. Operation of the transfer function for both the driver's seat and the passenger's seat is identical in the simplest embodiment of the present invention, and therefore, operation of the driver's seat transfer function will be described.

Figure 3:
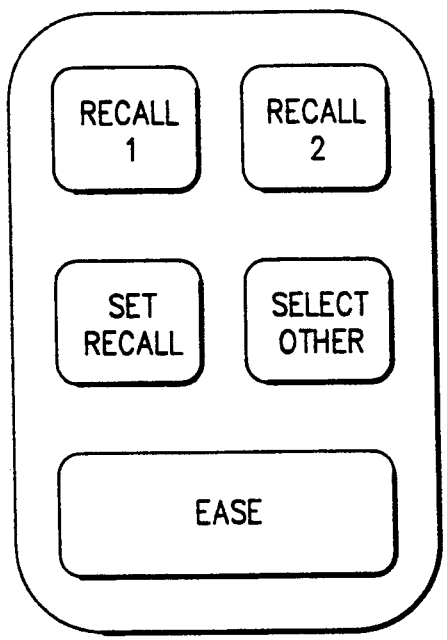
FIG. 3 is a block diagram of a data entry key pad of the control system of FIG. 1.
Figure 4A:
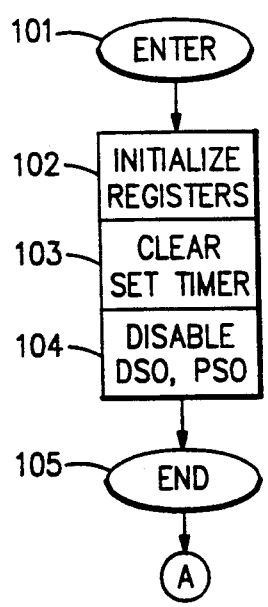
FIGS. 4a and 4b are flow diagrams of a control routine executed by a CPU of the system for enabling the transfer of memory seat recall positions in accordance with the invention.

Upon initial power-up of the vehicle electrical system, the subroutine of FIG. 4a is entered in a step 101. Thereafter, steps 102 through 104 are consecutively performed wherein each of the present position registers and the recall position registers are initialized to approximately the center position of the registers, a SET TIMER associated with the SET RECALL switch (FIG. 3) is cleared, and a driver's seat transfer status bit (DSO) and a passenger's seat transfer status bit (PSO) are disabled. The subroutine is then exited in a step 105.

Figure 4B:
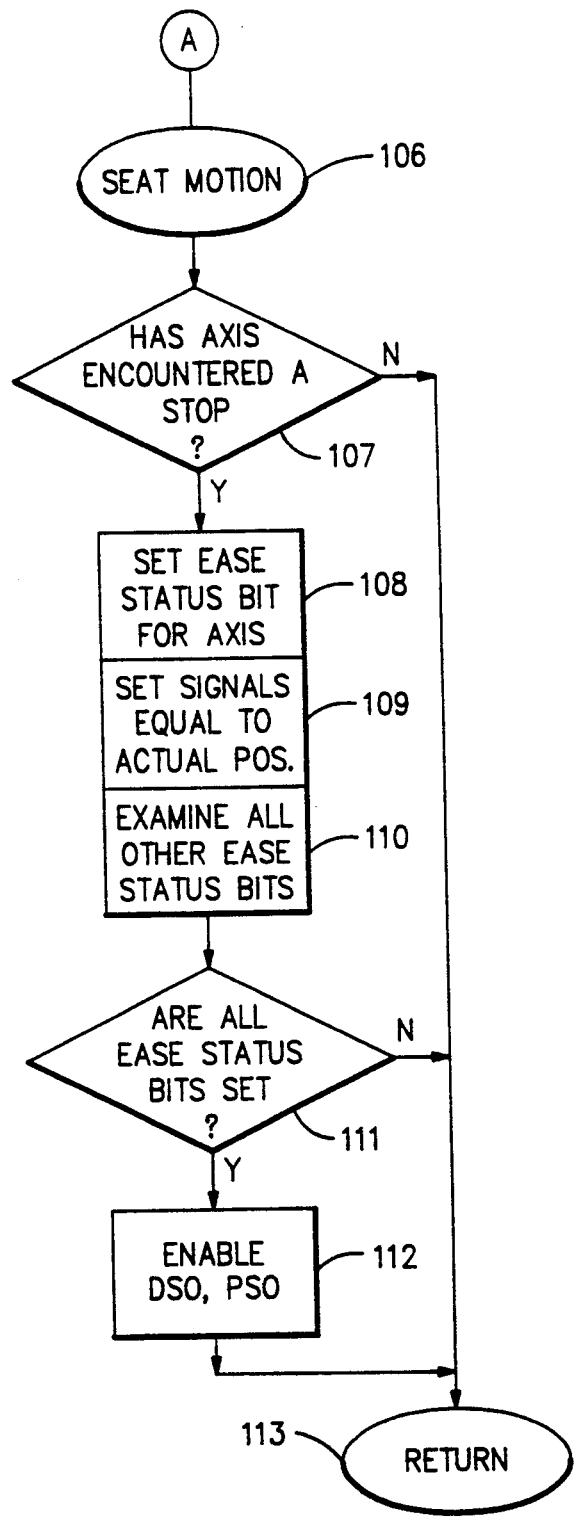

Thereafter, the subroutine of FIG. 4b is performed to maintain the transfer function disabled until the absolute position of both memory seats has been determined. Referring to FIG. 4b, when the driver's seat or the passenger's seat is in motion, the subroutine is entered in a step 106, and the subroutine checks in a test 107 if a stop, i.e., an end of axis, has been encountered along one of the axes of motion. If the results of the test 107 are negative, the subroutine returns in a step 113. However, if the results of the test 107 are positive, steps 108 through 110 are consecutively performed wherein the corresponding ease status bit is set for the axis that encountered the stop, the corresponding present position signal and recall signal for that axis are set equal to actual positions, i.e., the present position signal and the recall signal are decremented by the present position signal, and the status of the ease status bits for all of the other axes of motion for both seats is examined. Thereafter, the subroutine performs a test 111 to determine if all of the ease status bits for both seats are now set. If the results of the test 111 are negative, the subroutine returns in the step 113. If the results of the test 111 are positive, step 112 is performed wherein DSO and PSO are enabled. The subroutine then returns in the step 113.

When all of the ease status bits are set, DSO and PSO are enabled in the step 112, and the transfer function is now available. For purposes of the present invention, once DSO and PSO are enabled, they may be switched between two possible logic states. Initially, both DSO and PSO are cleared, and contain, for example, a logic zero. When, for example, a driver's side transfer function is selected, DSO is set, and contains a logic one. Once the transfer function has been completed, DSO is again cleared.

For debounce purposes, the subroutines require that there be a specified time period or waiting period, e.g., 80 milliseconds, 100 milliseconds, etc., before recognizing an activation of a switch on the memory seat control panel (FIG. 3). For example, if the SET RECALL switch is activated, the subroutine will check that the switch remains activated for 80 milliseconds before recognizing it as a valid input. This prevents the subroutine from recognizing a non-valid switch activation.

Before describing the transfer of memory seat recall positions, it will be beneficial to undertake a brief discussion of how recall positions are set. It will be understood that although the memory seat transfer function is not available until the absolute position of both seats is known, recall positions can be set for individual seats anytime after the vehicle electrical system is energized. Thereafter, once a recall position is set, the corresponding memory seat can be repositioned to that recall position.

Figure 5B:
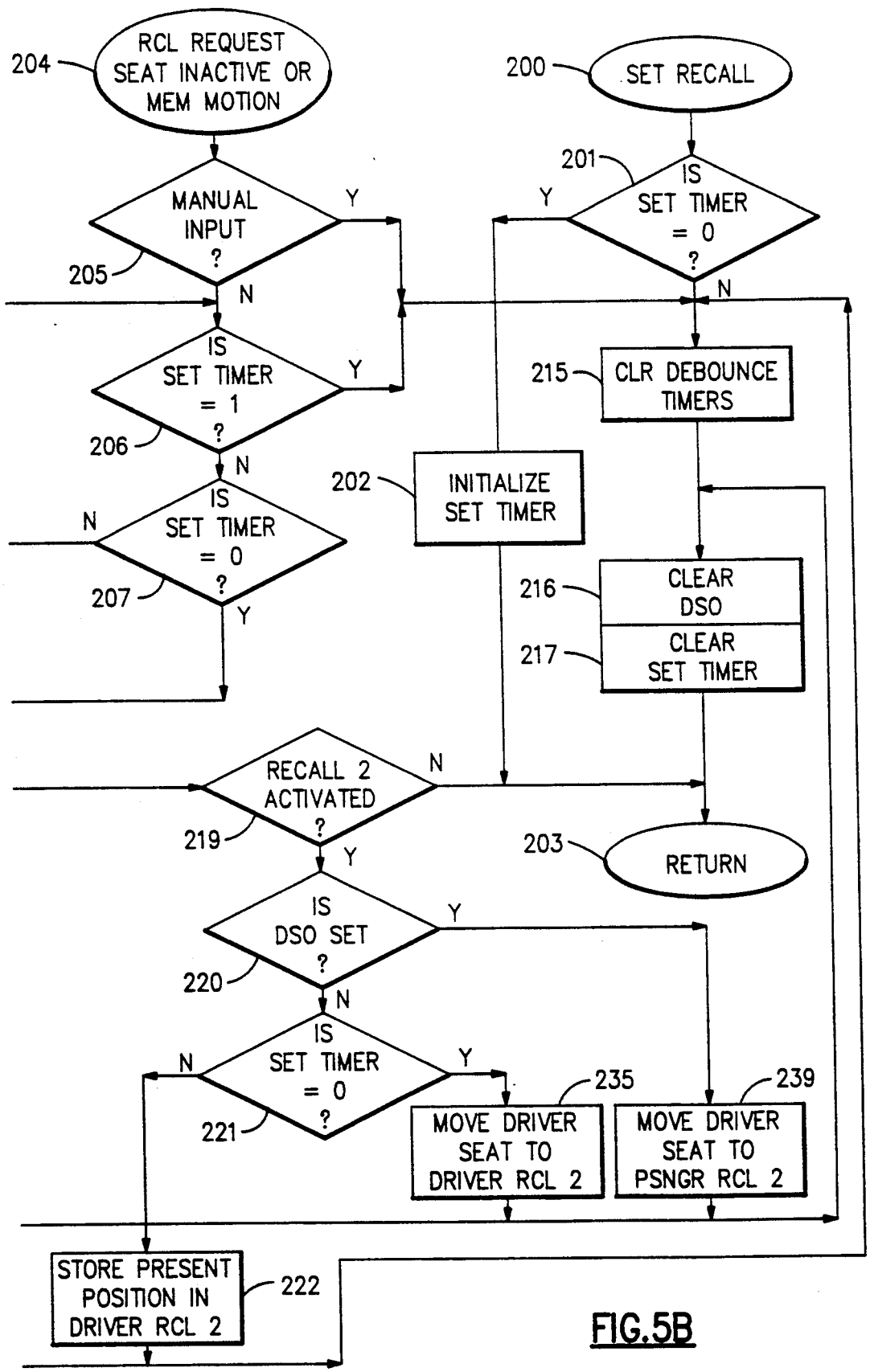

Referring to FIGS. 3 and 5, to set a recall position, the operator must first activate the SET RECALL switch and then, within a certain response time period, e.g., 3 seconds, activate the RECALL 1 or RECALL 2 switch on the control panel. After the SET RECALL switch is activated, the subroutine is entered in a step 200. The subroutine then checks in a test 201 if the SET TIMER is equal to zero. The SET TIMER was initially cleared upon system start up in step 103 (FIG. 4a), and the positive results of the test 201 reach a step 202 in which the SET TIMER is initialized to a certain value. The initial value of the SET TIMER is selected such that the time it takes for the subroutine to count down from that initial value to 1 is equal to the desired response period, e.g., 3 seconds. The subroutine then returns in a step 203.

After the SET RECALL switch is released, the subroutine is re-entered in step 204. The subroutine then checks in a test 205 for a manual input corresponding to the activation of one of the manual drive switches for controlling the motion of the seat. Assume there is no manual input being entered, and the negative results of the test 205 reach a test 206 wherein the subroutine checks if the SET TIMER is equal to one. Initially the SET TIMER is initialized to a value greater than one in the step 202, and the negative results of the test 206 reach a test 207 wherein the subroutine checks if the SET TIMER is equal to zero. The negative results of the test 207 reach a step 208 wherein the SET TIMER is decremented. The subroutine then checks in a test 209 if the RECALL 1 switch was activated after the SET RECALL switch.

Assuming that RECALL 1 was activated, the positive results of the test 209 reach a test 210 in which the subroutine checks if DSO is set. DSO has not been set, and the negative results of the test 210 reach a test 211 in which the subroutine checks if the SET TIMER is equal to zero. Since the SET TIMER was initialized in the step 202, the negative results of the test 211 reach a step 212 in which the driver's seat present position signal is stored in the driver's seat recall position registers corresponding to RECALL 1. Thereafter, steps 215 through 217 are consecutively performed wherein the debounce timers are cleared for each of the switches, DSO is cleared and the SET TIMER is cleared. The subroutine then returns in the step 203.

If the RECALL 1 switch was not activated after the SET RECALL switch, the results of the test 209 are negative, and the CPU checks in a test 219 if the RECALL 2 switch was activated. If the results of the test 219 are positive, tests 220 and 221, and step 222 are performed, corresponding to tests 210 and 211 and step 212, wherein the driver's seat present position signal is stored in the driver's seat recall position registers corresponding to RECALL 2. Thereafter, the steps 215 through 217 are consecutively performed wherein the debounce timers, DSO and the SET TIMER are cleared. The subroutine then returns in the step 203.

If the RECALL 2 switch was not activated, the results of the test 219 are negative, and the subroutine returns in the step 203. Thereafter, the subroutine is reentered in the step 204, and the CPU again checks in the test 205 for a manual input. The negative results of the test 205 again reach the test 206 in which the CPU checks if the SET TIMER is equal to 1. Initially the SET TIMER will continue to be greater than one, and the negative results of the test 206 reach the test 207, the negative results of which reach the step 208 in which the SET TIMER is decremented. If the activation of the SET RECALL switch is not followed by the activation of either the RECALL 1 or RECALL 2 switch within the response period, the SET TIMER will continue to be decremented in the step 208 until it reaches 1. Thereafter, the positive results of the test 206 reach the steps 215 through 217 in which the debounce timers, DSO and the SET TIMER are cleared. The subroutine then returns in the step 203.

The subroutine prevents the vehicle operator from transferring the driver's seat to a recall position for the passenger's seat until DSO has been enabled. In such an instance, if a transfer function is requested, the SEL OTHER switch is inactive and the subroutine merely transfers the driver's seat to the corresponding one of the driver's seat recall positions.

For example, if the SEL OTHER switch is activated followed by the RECALL 1 switch, the subroutine is entered in a step 230. The CPU then checks in a test 231 if the SET TIMER is equal to zero. Assuming that the SET TIMER was previously cleared in the step 217, the positive results of the test 231 reach a test 232 in which the CPU checks if DSO is enabled. If the absolute position of both seats has not yet been established, DSO is disabled, and the negative results of the test 232 reach a step 233 in which the DSO register is cleared. Thereafter, test 209 is performed in which the CPU checks if the RECALL 1 switch has been activated. The positive results of the test 209 reach the test 210 in which the CPU checks if DSO is set. The negative results of the test 210 reach the test 211 in which the CPU checks if the SET TIMER is equal to zero. The SET TIMER has not yet been initialized, and the positive results of the test 211 reach a step 234 in which the CPU provides motor control signals to activate the driver's seat motors to reposition the driver's seat to the recall position corresponding to driver's seat RECALL 1, i.e., the driver's seat is repositioned until the driver's seat present position signals equal the corresponding driver's seat recall signals corresponding to driver's seat RECALL 1. Thereafter, steps 216 and 217 are consecutively performed wherein DSO and the SET TIMER are cleared. The subroutine then returns in the step 203.

Similarly, if DSO is disabled, and the RECALL 2 switch is activated after the activation of the SEL OTHER switch, the subroutine reaches a step 235 in which the CPU provides motor control signals to activate the driver's seat motors to reposition the driver's seat to the recall position corresponding to driver's seat RECALL 2.

Once the absolute position of both seats is known, DSO is enabled, and the subroutine permits the vehicle operator to transfer the driver's seat to a recall position for the passenger's seat. If the operator depresses the SEL OTHER switch, the subroutine is entered in the step 230. The CPU then checks in the test 231 if the SET TIMER is equal to zero. Initially, the SET TIMER is cleared, and the positive results of the test 231 reach the test 232 in which the CPU checks if DSO is enabled. The positive results of the test 232 reach steps 236 and 237 wherein the SET TIMER is initialized and DSO is set. The subroutine then checks in the test 209 if RECALL 1 has been activated.

If RECALL 1 was activated, the positive results of the test 209 reach the test 210 wherein the CPU checks if DSO is set. DSO was set in the step 237, and the positive results of the test 210 reach a step 238 wherein the CPU provides motor control signals to activate the driver's seat motors to reposition the driver's seat to the recall position corresponding to passenger's seat RECALL 1, i.e., the driver's seat is repositioned until the driver's seat present position signals are equal to the corresponding passenger's seat recall signals corresponding to the passenger's seat RECALL 1. Thereafter, steps 216 and 217 are consecutively performed wherein DSO and the SET TIMER are cleared. The subroutine then returns in the step 203.

Similarly, if DSO is enabled, and the RECALL 2 switch is activated after the activation of the SEL OTHER switch, the subroutine reaches a step 239 in which the CPU provides motor control signals to activate the driver's seat motors to reposition the driver's seat to the recall position corresponding to passenger's seat RECALL 2. If neither the RECALL 1 or RECALL 2 switches are activated after activation of the SEL OTHER switch, the subroutine returns in the step 203. Thereafter, the subroutine is reentered in the step 204, and reaches the step 208 wherein the SET TIMER is decremented. If RECALL 1 or RECALL 2 are not activated within the required period, the SET TIMER continues to be decremented in the step 208 until it reaches 1. Thereafter, the positive results of the test 206 reach the steps 215 through 217 in which the debounce timers, DSO and the SET TIMER are cleared. The subroutine then returns in the step 203.

Finally, if the operator activates, for example, the RECALL 1 switch for the driver's seat, the subroutine is entered in the step 204. The subroutine then checks in the step 205 for a manual input. The negative results of the test 205 reach the test 206 wherein the subroutine checks if the SET TIMER is equal to one. Since the SET TIMER is cleared, the negative results of the test 206 reach the test 207 wherein the subroutine checks if the SET TIMER is equal to zero. The positive results of the test 207 reach the test 209 wherein the subroutine checks if the RECALL 1 switch has been activated. The positive results of the test 209 reach the test 210 wherein the subroutine checks if DS is set. The negative results of the test 210 reach the test 211 wherein the subroutine checks if the SET TIMER is equal to zero. The positive results of the test 211 reach the step 234, wherein the CPU provides motor control signals to activate the driver's seat motors to reposition the driver's seat to the driver's seat recall position 1. Thereafter, steps 216 and 217 are consecutively performed wherein DSO and the SET TIMER are cleared. The subroutine then returns in the step 203.

If at any time a manual input is received, the subroutine is entered in the step 204. The subroutine then checks in the test 205 for a manual input. The positive results of the test 205 reach the steps 215 through 217 wherein the debounce timers, DSO and the SET TIMER are cleared. The subroutine then returns in the step 203. Therefore, upon receipt of a manual input, all memory motion is stopped.

In accordance with an alternative embodiment of the present invention, in addition to the transfer function described hereinabove with respect to FIG. 5, the added capability of a set other recall function, i.e., storing the present position signal for the driver's seat in recall position registers for the passenger's seat, is provided. Like the transfer function, this added memory capability is only available when the absolute position of both seats has been established.

Figure 6B:
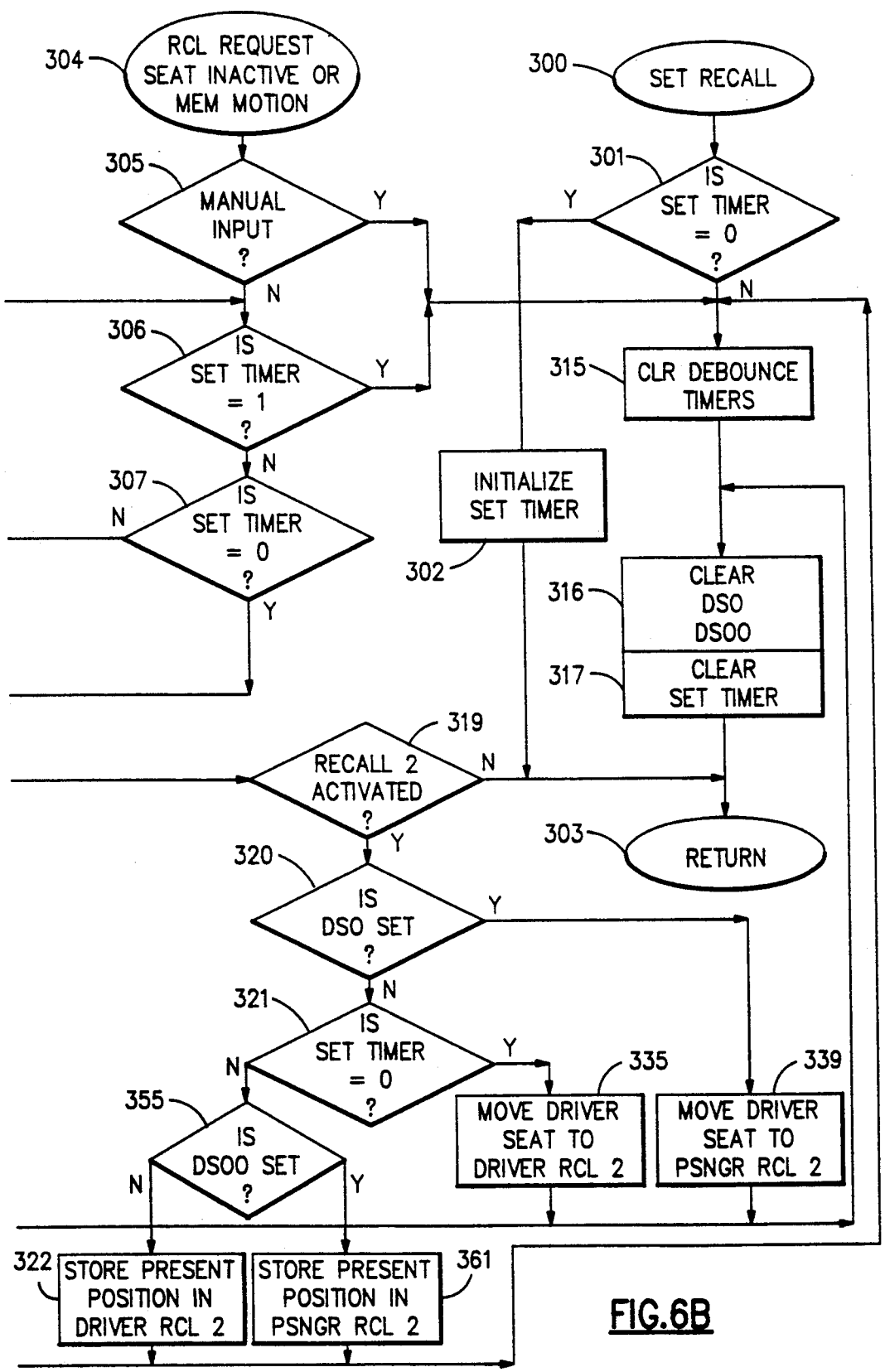

Referring to FIG. 6, a subroutine employing the alternative embodiment of the present invention is illustrated. For ease of explanation and understanding, blocks in the FIG. 6 subroutine corresponding to blocks in the FIG. 5 subroutine use the same sequential numbering incremented by 100. For example, a step labeled 300 in FIG. 6, corresponding to the activation of the SET RECALL switch, corresponds to the step 200 in FIG. 5.

The set other recall function is activated by first activating the driver's side SET RECALL switch. Next, the operator must activate the SEL OTHER switch, followed by either the RECALL 1 or RECALL 2 switch, within the response period as described hereinbefore with respect to the subroutine of FIG. 5. Thereafter, the present position signal for the driver's seat is stored in the recall position registers for the passenger's seat RECALL 1 or RECALL 2.

As described hereinabove, the operator is not able to use the set other recall function until DSO and PSO have been enabled. In such an instance, the driver's seat present position signal is stored in corresponding recall position registers for the driver's seat. For example, if a set other recall function is attempted prior to DSO being set, the subroutine is entered in step 300. Next, the subroutine checks in a test 301 if the SET TIMER is equal to zero. Initially, the SET TIMER is cleared, and the positive results of the test 301 reach a step 302 wherein the SET TIMER is initialized. The subroutine then returns in a step 303.

Upon activation of the SEL OTHER switch, the subroutine is reentered in a step 330. Next, the subroutine sets a select other status bit (DSOO) in a step 350. The subroutine then checks if the SET TIMER is equal to zero in a test 331. The SET TIMER was initialized in the step 302, and the negative results of the test 331 reach a test 352 in which the subroutine checks if DSO is enabled. The negative results of the test 352 reach steps 333 and 354 wherein DSO and DSOO are cleared. Next, test 309 is performed in which the CPU checks if the RECALL 1 switch has been activated.

Assuming that RECALL 1 was activated, the positive results of the test 309 reach a test 310 in which the CPU checks if DSO is set. The negative results of the test 310 reach a test 311 in which the CPU checks if the SET TIMER is equal to zero. The negative results of the test 311 reach a test 355 in which the subroutine checks if DSOO is set. DSOO was cleared in the step 354, and the negative results of the test 355 reach a step 312 in which the driver's seat present position signal is stored in the driver's seat recall position registers corresponding to RECALL 1. Thereafter, steps 315 through 317 are consecutively performed wherein the debounce timers, DSO, DSOO and the SET TIMER are cleared. The subroutine then returns in the step 303.

Similarly, if DSO is disabled, and the RECALL 2 switch is activated after the sequential activation of the SET RECALL and SEL OTHER switches, the subroutine reaches a step 322 in which the driver's seat present position signal is stored in the driver's seat recall position registers corresponding to RECALL 2.

If neither the RECALL 1 or RECALL 2 switches are activated, the subroutine returns in the step 303. Thereafter, the subroutine is reentered in the step 304, and the CPU checks in a test 305 for a manual input. The negative results of the test 305 reach a test 306 in which the CPU checks if the SET TIMER is equal to 1. Initially the SET TIMER will be greater than one because it was initialized in the step 302, and the negative results of the test 306 reach a test 307 in which the subroutine checks if the SET TIMER is equal to zero. The negative results of the test 307 reach a step 308 in which the SET TIMER is decremented. If neither the RECALL 1 or RECALL 2 switch is activated within the response period, the SET TIMER will continue to be decremented in the step 308 until it reaches 1. Thereafter, the positive results of the test 306 reach the steps 315 through 317 in which the debounce timers, DSO, DSOO and the SET TIMER are cleared. The subroutine then returns in the step 303.

Once DSO is enabled, the set other recall function is available, and the operator may store the driver's seat present position signal in one of the passenger's seat recall position registers. For example, upon activation of the SET RECALL switch, the subroutine is entered in the step 300. The subroutine then checks in the test 301 if the SET TIMER is equal to zero, and the positive results of the test 301 reach the step 302 wherein the SET TIMER is initialized. The subroutine then returns in the step 303.

Upon activation of the SEL OTHER switch, the subroutine is reentered in the step 330, and thereafter DSOO is set in the step 350. Next the subroutine checks if the set timer is equal to zero in the test 331. The negative results of the test 331 reach the test 352 in which the subroutine checks if DSO is enabled. The positive results of the test 352 reach the test 306 in which the subroutine checks if the SET TIMER is equal to one. The SET TIMER is initialized to a value greater than one in the step 302, and the negative results of the test 306 reach the test 307 wherein the subroutine checks if the SET TIMER is equal to zero. The negative results of the test 307 reach the step 308 wherein the SET TIMER is decremented. Next, test 309 is performed in which the CPU checks if the RECALL 1 switch has been activated.

Assuming that RECALL 1 was activated, the positive results of the test 309 reach the test 310 in which the CPU checks if DSO is set. DSO has not been set, and the negative results of the test 310 reach the test 311 in which the CPU checks if the SET TIMER is equal to 0. The negative results of the test 311 reach the test 355 in which the subroutine checks if DSOO is set. The positive results of the test 355 reach a step 359 in which the driver's seat present position signal is stored in the passenger's seat recall position registers corresponding to RECALL 1. Thereafter, steps 315 through 317 are consecutively performed wherein the debounce timers, DSO, DSOO and the SET TIMER are cleared. The subroutine then returns in the step 303.

Similarly, if DSO is enabled, and the RECALL 2 switch is activated after the sequential activation of the SET RECALL and SEL OTHER switches, the subroutine reaches a step 361 in which the driver's seat present position signal is stored in the passenger's seat recall position registers corresponding to RECALL 2.

The invention is described as being used with a memory seat control system wherein the present position registers and the recall position registers have a capacity for storing approximately N or preferably 1.25 N counts, but clearly less than 2 N counts. However, the invention will work equally as well in a control system having a different memory size provided that the seat position information contained in a memory can be equated to the actual position of the seat along the corresponding axis.

The actual position of a seat along a corresponding axis is described as being established by the seat encountering the end of axis travel. However, the actual position of the seat can also be established, for example, by positioning a switch or sensor along the axis, and establishing the actual position of the seat once the switch or sensor is encountered. Thereafter, the present position signal is set equal to a value corresponding to the established position, and the corresponding recall position register is incremented or decremented to maintain the proper relationship between the present position signal and the recall signal for the axis.

Prior to allowing the performance of a transfer function, the subroutine of FIG. 4b requires that the actual position of both memory seats along every axis of seat movement first be established. However, in accordance with the broadest aspect of the present invention, the transfer function may be enabled after the actual position of the seats are established for only certain of the axes. For example, once the actual position of the seats is established for the horizontal axis of motion, the transfer function can be enabled. Additionally, although the manual drives switches and the memory switches are illustrated on separate control panels, the invention will work equally as well if both the manual drive switches and the memory switches are located on a common control panel.

Although the invention has been illustrated and described with respect to exemplary embodiments thereof, it should be understood by those skilled in the art that the foregoing and various other changes, omissions and additions may be made therein and thereto, without departing from the spirit and scope of the present invention.

I claim:

1. A vehicle seat control system, comprising:
   a present position signal means for providing a present position signal indicative of a present displacement position of a first seat, said first seat being repositionable by a seat positioning motor;
   a recall signal means for providing a recall signal indicative of a recall position of a second seat; and
   motor control means responsive to said present position signal and said recall signal for providing a motor control signal to said seat positioning motor to continuously reposition said first seat until said present displacement position is the same as said recall position.

2. A vehicle seat control system according to claim 1 further comprising signal status means for receiving data of a first kind when said present position signal is indicative of a relative present displacement position of said first seat or when said recall signal is indicative of a relative recall position of said second seat, said signal status means receiving data of a different kind when said present position signal is indicative of an actual present displacement position of said first seat and said recall signal is indicative of an actual recall position of said second seat, said motor control means being responsive to said present position signal and said recall signal for providing said motor control signal only when said signal status means contains data of said different kind.

3. A vehicle seat control system according to claim 2 further comprising signal storage means responsive to said present position signal and said recall signal for setting said recall signal equal to said present position signal.

4. A vehicle seat control system according to claim 3 wherein said signal storage means is responsive to said present position signal and said recall signal for setting said recall signal equal to said present position signal only when said signal status means contains data of said different kind.

5. A vehicle seat control system according to claim 4 further comprising a second recall signal means for providing a second recall signal indicative of a second recall position of said second seat.

6. Apparatus for controlling a plurality of seat positioning motors, each motor being operative to reposition one of a plurality of vehicle seats in either of two opposite directions along a corresponding axis of limited extent, comprising:
   means for producing digital signals during operation of one of said motors, each digital signal being representative of incremental displacement of a seat along a corresponding axis;
   present position signal means containing digital signals indicative of a present displacement position of a corresponding one of said seats along a corresponding axis;
   recall signal means containing digital signals indicative of a recall position of another of said seats along a corresponding axis;
   first user control means for providing a reposition signal in response to the selective activation of said first user control means; and
   motor control means responsive to said reposition signal for providing a motor control signal to said one of said motors to continuously reposition said corresponding one of said seats until said present displacement position of said corresponding one of said seats is the same as said recall position of said another of said seats.

7. Apparatus according to claim 6 wherein said digital signals contained in said present position signal means and in said recall signal means are initially indicative of relative incremental displacement of said seats along said corresponding axes, and wherein said digital signals contained in said present position signal means and in said recall signal means are indicative of actual incremental displacement of said seats along said corresponding axes after each of said seats encounter an end of axis travel along said corresponding axes.

8. Apparatus according to claim 7 wherein the difference between digital signals contained in corresponding ones of said present position signal means and said recall signal means is indicative of the amount of seat movement to reposition the corresponding one of the seats from said present displacement position to said recall position.

9. Apparatus according to claim 7 wherein said motor control means is responsive to said reposition signal only when said digital signals contained in said present position signal means and in said recall signal means are indicative of actual incremental displacement of said seats along said corresponding axes.

10. Apparatus according to claim 9 further comprising:
    second user control means for providing a set other recall signal in response to the selective activation of said second user control means; and
    signal storage means responsive to said set other recall signal for storing digital signal indicative of said present displacement position of one of said seats in said recall signal means corresponding to another of said seats, said signal storage means being responsive to said set other recall signal only when said digital signals contained in said present position signal means and in said recall signal means are indicative of actual incremental displacement of said seats along said corresponding axes.

11. A method for controlling a seat positioning motor, comprising the steps of:
    providing a present position signal, indicative of a present displacement position of a first seat, to a motor control means, said first seat being repositionable by the motor;
    providing a recall signal, indicative of a recall position of a second seat, to said motor control means; and
    said motor control means being responsive to said present position signal and said recall signal for providing a motor control signal to the motor to continuously reposition said first seat until said present displacement position is the same as said recall position.

12. The method of claim 11 further comprising the steps of:
    placing data of a first kind in a signal status means when said present position signal is indicative of a relative present displacement position of said first seat or when said recall position is indicative of a relative recall position of said second seat; and placing data of a different kind in said signal status means when said present position signal is indicative of an actual present displacement position of said first seat and said recall signal is indicative of an actual recall position of said second seat, said motor control means being responsive to said present position signal and said recall signal for providing said motor control signal to said motor only when said signal status means contains data of said different kind.

13. The method of claim 12 further comprising the steps of:

providing a set other recall signal; and setting said recall signal equal to said present position signal in response to said set other recall signal.

14. The method of claim 13 wherein said recall signal is set equal to said present position signal in response to said set other recall signal only when said signal status means contains data of said different kind.

15. A method for controlling seat positioning motors, each motor being operative to reposition one of a plurality of vehicle seats in either of two opposite directions along a corresponding axis of limited extent, the method comprising the steps of:

producing digital signal during operation of one of said motors, each digital signal being representative of incremental displacement of a seat along a corresponding axis;

placing digital signals indicative of a present displacement position of a corresponding one of said seats along a corresponding axis in a present position memory means;

placing digital signals indicative of a recall position of another of said seats along a corresponding axis in a recall memory means;

providing a reposition signal to a motor control means in response to the selective activation of a first user control means, said motor control means producing a motor control signal in response to said reposition signal; and providing said motor control signal to one of said motors to continuously reposition said corresponding one of said seats until said present displacement position of said corresponding one of said seats is the same as said recall position of said another of said seats.

16. The method of claim 15 further comprising the steps of:

initially setting digital signals to be indicative of relative incremental displacement of said seats along said corresponding axes; and setting digital signals to be indicative of actual incremental displacement of said seats along said corresponding axes after each of said seats encounters an end of axis travel along said corresponding axes.

17. The method of claim 16 wherein said motor control means is responsive to said reposition signal only when said digital signals contained in said present position signal means and in said recall signal means are indicative of actual incremental displacement of said seats along said corresponding axes.

18. The method of claim 17 further comprising the steps of:

providing a set other recall signal in response to the selective activation of a second user control means, said second user control means being responsive to provide said set other recall signal only when said digital signals contained in said present position signal means and in said recall signal means are indicative of actual incremental displacement of said seats along said corresponding axes; and storing digital signal indicative of said present displacement position of one of the seats in said recall memory means corresponding to another of the seats in response to said set other recall signal.

* * * * *